June 16, 1964 K. FAUL 3,137,367
BRAKE

Filed April 24, 1962 2 Sheets-Sheet 1

INVENTOR.
KARL FAUL
BY
ATTORNEYS

June 16, 1964   K. FAUL   3,137,367
BRAKE
Filed April 24, 1962   2 Sheets-Sheet 2

INVENTOR.
Karl Faul
BY
Imirie and Smiley
ATTORNEY

United States Patent Office 3,137,367
Patented June 16, 1964

3,137,367
BRAKE
Karl Faul, 109 Gumpendorferstrasse, Vienna VI, Austria
Filed Apr. 24, 1962, Ser. No. 189,735
Claims priority, application Austria, July 6, 1961
10 Claims. (Cl. 188—70)

This invention relates to a brake, which consists of a disc-drum brake and serves mainly for braking the wheels of motor vehicles, airplanes etc.

It is a feature of the invention that the brake comprises a brake drum, at least one brake shoe, a brake lining intended to be operated by said brake shoe, means for compelling the brake shoe to coact with the brake lining, a braking surface extending at right angles to the central axis of the brake drum, and a second braking surface extending at a substantially acute angle to the first-mentioned braking surface.

Another feature of the invention resides in that means for automatically readjusting the brake when the brake lining has suffered wear are provided.

Finally, it is a feature of the invention that means for forcing the brake against the brake linings under uniform pressure are provided.

Two illustrative embodiments of the brake according to the invention are shown on the drawing.

Figure 1:
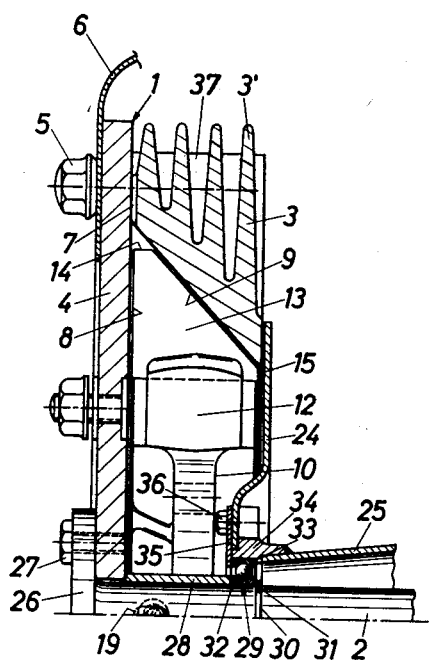
FIG. 1 is an axial sectional view showing the first embodiment of the brake.
Figure 2:
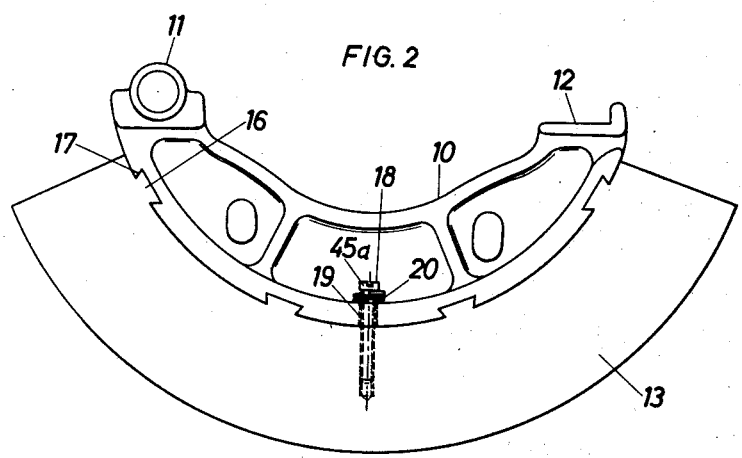
FIG. 2 is an end view showing one half of a brake shoe of the brake according to FIG. 1.
Figure 5:
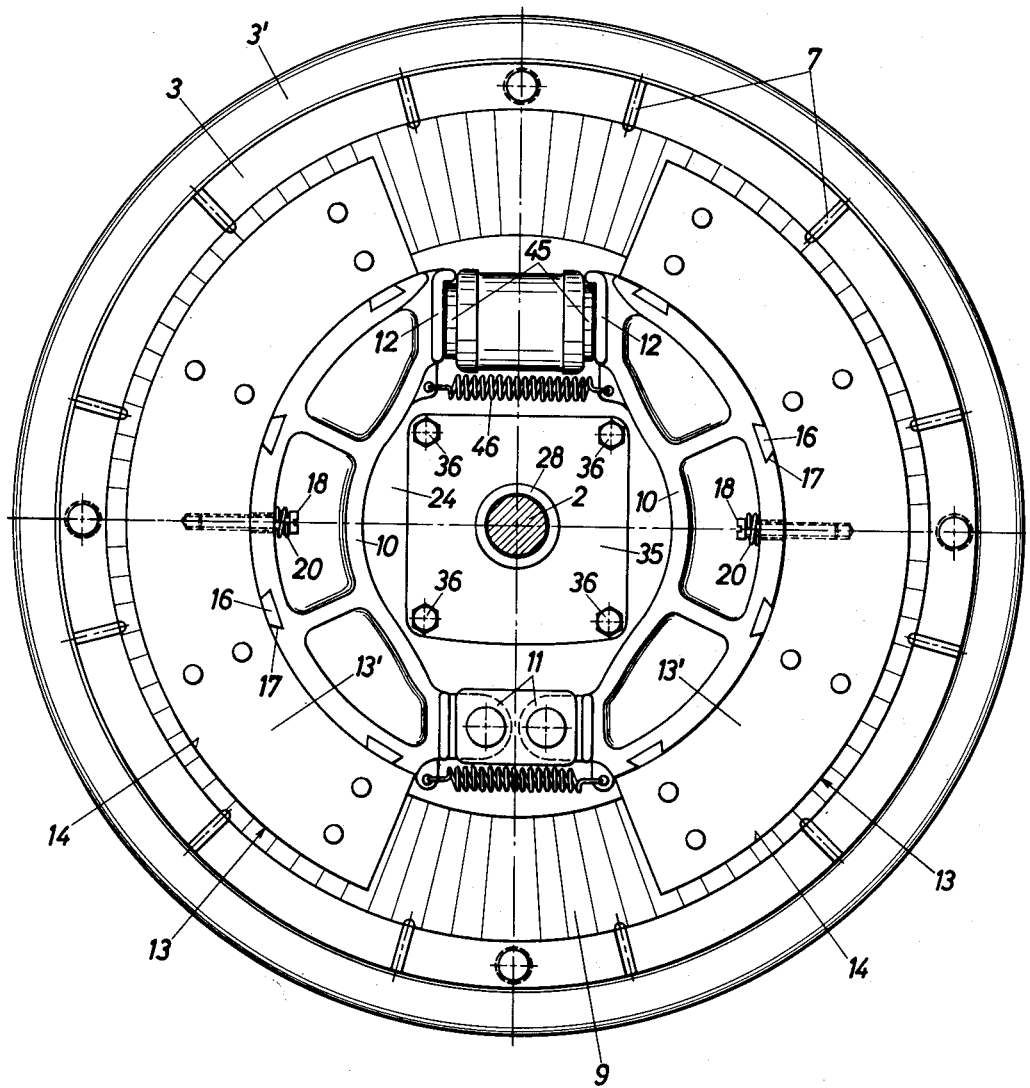
FIG. 5 is an end elevation of a complete brake assembly embodying the brake of FIG. 1 with the outer portion of the brake drum omitted.

In the first embodiment, shown in FIGS. 1, 2 and 5, the brake comprises a split brake drum 1, which is mounted on the stub axle 2 of the wheel. This brake may be mounted at the rear wheels as well as at the front wheels of a motor vehicle. The drum 1 comprises an inner part 3 provided with peripheral cooling fins 3' and the plate-like part 4, which is fitted on the free end of the stub axle 2 and is locked by means of a plate 26, which is connected by bolts 27 to the part 4 and engages the end face of the stub axle 2. Part 4 bears on a sleeve 28, which urges the inner race 32 of the ball bearing 29 against an expansible ring 31 inserted in a groove 30 of the stub axle 2. The outer race 33 of this ball bearing 29 is fitted in the end portion 34 of the flared axle tube 25 and is locked by a ring 35 and the bolts 36, which serve also to connect the brake plate 24 to the end of the flared axle tube 25.

The part 3 of the brake drum 1 is provided with angularly regularly spaced lugs 37, which may be formed with transverse bores for receiving the screws 5 holding the two parts 3 and 4 of the drum together. As shown in the drawing, the screws 5 may also serve for securing the wheel or the rim 6 to the drum 1. The transverse bores in the lugs 37 may be screw-threaded.

To hold the two parts 3 and 4 of the brake drum in position, all or some of the connecting screws 5 may consist of fitting screws, or two or more fitting pins (not shown) may be provided and disposed each between two connecting screws.

One of the drum parts 3, 4, part 3 in the embodiment shown, is formed in its surface facing the other of said parts with recesses 7 which form channels leading outwardly from the interior of the brake and serve for discharging material worn off in the brake and any water which may have penetrated into the brake.

The brake surface 8 formed by the drum part 4 extends in a plane which is at right angles to the drum axis whereas the brake surface 9 of the part 3 is curved in accordance with a conical surface, the generatrix of which are inclined at an acute angle to the plane of the first-mentioned brake surface 8. This generatrix may be slightly curved.

The brake drum contains in its interior two opposed brake shoes 10, which are pivoted to the carrying plate 24 at two adjacent, see FIG. 5, or diametrically opposed ends provided with a bearing eye 11 each. The two other ends of the brake shoes are provided each with a surface 12 for engagement by the brake wrench, cam, piston 45, FIG. 5, or the like, which serves for spreading the brake shoes apart. The retraction of the brake shoes from their braking position is effected by springs. If the brake shoes are pivoted at adjacent ends, only one of said springs is provided, see 46, FIG. 5, which connects the free ends of the two brake shoes and pulls them together, whereas when the brake shoes are pivoted at diametrically opposed ends each of the brake shoes is provided with a separate return spring.

The brake shoes 10 carry a brake lining 13, which has the cross-sectional shape of a right-angled triangle having flattened corners 14, 15. Owing to these flats, the adjustability of the brake lining enables it to remain fully effective even after substantial wear, as contrasted with the known brake linings. The adjustability of the brake lining will be described hereinafter. In general, the wear may be permitted to continue until the flat 15 is used up. To enable an axial adjustment of the brake lining, there are provided, on the lining, dovetailed projections 16, which engage corresponding grooves 17 of the brake shoe 10. The projections and groove may be provided in any number. Alternatively, they may be rectangular in configuration. To limit the axial displacement of the brake lining 13, a bolt 18 is screwed into the lining 13 and is guided in an axially extending slot 19 of the brake shoe 10. A flat spring 20 or a spiral spring or the like is inserted between the head 45a of the bolt 18 and the brake shoe 10 to partly brake the movement of the brake lining 13 and to hold the same in its self-centered position.

Figure 3:
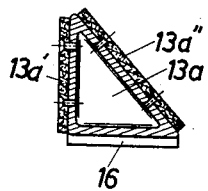
FIG. 3 is a transverse sectional view showing a modified embodiment of the brake body.

As is shown in FIG. 3, the brake lining having a triangular cross-section may be replaced by a hollow body 13a which has the same shape and is axially slidably mounted on the brake shoe and has a brake lining 13a', 13a" on each of its surfaces facing the brake drum. The brake linings 13a' and 13a" may be secured by riveting, screwing, adhering, welding etc.

The described disc-drum brake operates as follows: When the application of the brake causes the brake shoes to be spread apart, their braking surface 9 will engage the oblique surface of the brake drum part 3. The braking pressure effective between the two surfaces displaces the brake body 13 or 13a in the grooves 17 toward the part 4 of the brake drum so that an intimate contact is also established between part 4 and the vertical braking surface 8 of the brake body 13 or 13a. This self-centering displacement of the brake body has the advantage that the same braking pressure will be automatically obtained at both braking surfaces during braking independently of the wear of the braking surfaces.

Release of the brake will permit the return springs to lift the brake shoes 10 from the drum part 3. When the brake has been released, the braking pressure set up during braking between the brake body 13 or 13a and the drum part 4 causes a slight axial displacement of the brake body 13 or 13a. The braking action will be eliminated when this displacement has proceeded by a fraction of a millimeter.

To enable the use of the disc-drum brake for wheels of various diameters, a plurality of series of holes disposed on circles of different diameters are provided for the screws 5.

Figure 4:
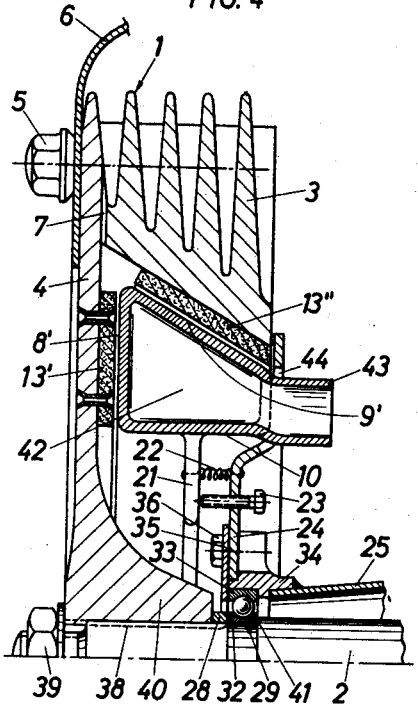
FIG. 4 is an axial sectional view showing a second embodiment of the brake.

In the disc-drum brake shown in FIG. 4, the stub axle 2 carries at its free end teeth 38, on which the part 4 of the splite brake drum is fitted and locked with the aid of the nut 39. The hub 40 of the part 4 bears on the sleeve 28, which urges the inner race 32 of the ball bearing 29 against a shoulder 41 of the stub axle 2. The mounting of the outer race 33 in part 34 and its locking by the ring 35 and the screw 36 is similar to the arrangement in the embodiment of FIGS. 1 and 2.

Each of parts 3 and 4 are provided with an annular brake lining 13' and 13'', respectively. The brake lining 13' of part 4 is disposed in a vertical plane whereas the brake lining 13'' of part 14 is curved according to a conical surface having a straight or slightly curved generatrix which are inclined at an acute angle toward said vertical plane.

The brake shoes 10 are hollow and their braking surfaces 8', 9' extend parallel to the surfaces of the brake linings 13', 13''. The interior cavity 42 of the brake shoe communicates with the outer space by means of two connection pipes 43 disposed close to opposite ends of the brake shoe. Only one of these connecting pipes is shown in the drawing. The connecting pipes 43 provide for a replacement of the coolant flowing through the cavity 42.

The brake plate 24 has openings 44 through which the connecting pipes 43 of the shoes 10 extend with a clearance sufficient to enable the movement of the shoes. One of the two outwardly projecting connection pipes 43 may be provided with an elbow which is directed against the relative wind and serves for conducting air into the interior of the brake shoe during travel. To achieve an intensified cooling action, one of these connecting pipes may be connected to a hose through which the interior cavity of the shoe is supplied with compressed air, which may be obtained from the fan for cooling the motor.

It is obvious that liquid may be used for cooling brakes for particularly high duty. In this case, both connecting pipes of each brake shoe must be provided with flexible conduits through which coolant can be supplied and discharged to a cooler.

To ensure the application of the brake shoes at the brake lining under uniform pressure, the brake shoes may be hydraulically or mechanically displaced parallel to themselves.

The width of the brake linings 13', 13'' is desirably equal to or less than the width of the braking surfaces 8', 9' of the brake shoes 10 so that the wear of the brake linings cannot result in the formation of steps.

To enable an adjustment of the brake shoes 10, the same are provided with lugs 21 urged by springs 22 against set screws 23, which are threadedly inserted in the brake plate 24.

The mode of operation of the brake is similar to that of the embodiment of FIGS. 1 and 2, with the difference that the axial adjustability of the brake body is replaced by a certain axial displaceability of the bearing means for the brake shoe, which displaceability is sufficient for readjusting the brake. The spring 22 serves to lift the brake shoes 10 from the brake lining 13' when the brake has been released.

Various changes in structure may obviously be made within the scope of the invention. For instance, separate wheel screws may be provided beside the screws 5. Leaf springs, disc springs or the like, bearing on the flared axle tube 25, may be used for readjusting the brake shoes.

What is claimed is:

1. A brake for wheeled vehicles, comprising a rotary brake drum for fixed coupling to an axle of a wheel, a non-rotatable carrying plate securable to said axle, said brake drum having a first braking surface extending substantially at right angles to the axis of rotation of said wheel and a second braking surface inclined at an acute angle to said first braking surface, said braking surfaces defining a space between them of wedge-shaped cross-section in which at least two brake shoes are inserted, said brake shoes having converging braking surfaces parallel to said braking surfaces of the brake drum, at least one of said braking surfaces of the drum and brake shoes being formed by a brake lining, each of said brakes shoes having substantially the shape of a sector of a ring, means connecting the brake shoes to said carrying plate with freedom of movement in axial and radial directions, means for engaging the brake shoes with the brake drum, and means for retracting the brake shoes from the brake drum.

2. A brake as set forth in claim 1 wherein each brake shoe is formed in two portions, said first portion having said brake surfaces and being of triangular cross-sectional shape and said second portion having interfitting means slidably guiding said first portion in an axial direction and forming part of said means connecting the brake shoe to the carrying plate with freedom of movement in the axial direction.

3. A brake as set forth in claim 2 wherein said interfitting means comprises projections on said second portion engaging axial grooves of said first portion of each brake shoe.

4. A brake as set forth in claim 2 wherein said first portion of each brake shoe comprises a brake lining having a right triangular cross section, the angles of the right triangle of the cross-section other than the right angle being removed to form flattened corners.

5. A brake as set forth in claim 4 wherein said second portions are each provided with an axial slot and said brake lining of each brake shoe is secured to the second portion by bolt means seated in said slot and limiting axial movement of the brake lining by engagement of said bolt means with the end walls of the slot.

6. A brake as set forth in claim 4 wherein said first portion of each brake shoe is hollow and a brake lining is secured to the two converging brake surfaces of one of said drum and brake shoe, said brake linings extending at least the full sector length of each brake shoe.

7. A brake as set forth in claim 6 wherein the hollow portion of each brake shoe is provided with connecting duct means for circulation therethrough of a coolant fluid.

8. A brake as set forth in claim 1 wherein said means connecting the brake shoes to the carrying plate for axial and radial movement includes a spring biasing each brake shoe in an axial direction and an adjustable bolt means threaded through an opening in the carrying plate and engaging the brake shoe to limit motion thereof engendered by said spring.

9. A brake as set forth in claim 1, wherein said brake drum includes at least two parts, one of which is substantially platelike and forms the braking surface which extends at right angles to the axis of rotation and the other part having the inclined brake surface, a plurality of bolts connecting the two parts of the drum and usable also for fixing a road wheel to the brake drum.

10. A brake as set forth in claim 9 wherein said other part of the brake drum when secured to the first part leaves small spaced passages extending from the interior of the converging brake surfaces to the exterior of the drum for passage of water, dust, ground bits of brake lining and the like.

References Cited in the file of this patent

UNITED STATES PATENTS

| | | |
|---|---|---|
| 1,875,989 | Charles | Sept. 6, 1932 |
| 2,047,556 | Harvey | July 14, 1936 |
| 2,582,755 | Kenny | Jan. 15, 1952 |
| 2,655,227 | Eksergian | Oct. 13, 1953 |
| 2,911,075 | Damiron | Nov. 3, 1959 |
| 3,041,003 | Kettler | June 26, 1962 |
| 3,065,829 | Bessler et al. | Nov. 26, 1962 |

FOREIGN PATENTS

| | | |
|---|---|---|
| 26,667 | Great Britain | Dec. 7, 1904 |
| 21,450 | Great Britain | Sept. 27, 1906 |
| 310,656 | Italy | Aug. 30, 1933 |